United States Patent
Liu et al.

(10) Patent No.: US 9,967,730 B2
(45) Date of Patent: *May 8, 2018

(54) DEVICE LINKING

(71) Applicant: Microsoft Technology Licensing, LLC, Redmond, WA (US)

(72) Inventors: Min Liu, Redmond, WA (US); Anthony V. Discolo, Sammamish, WA (US); Edmund Hon-Sum Lui, Bellevue, WA (US); Kean Ee Lim, Issaquah, WA (US); Ryan B. Elgram, Bothell, WA (US); Donald F. Box, Bellevue, WA (US); Martin J. Gudgin, Sammamish, WA (US); Zhangwei Xu, Redmond, WA (US); Todd R. Manion, Seattle, WA (US); Grant Gardner, Seattle, WA (US); Jeremy L. Dewey, Duvall, WA (US); Shiraz J. Cupala, Seattle, WA (US); Curt A. Steeb, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/442,346

(22) Filed: Feb. 24, 2017

(65) Prior Publication Data
US 2017/0164180 A1    Jun. 8, 2017

Related U.S. Application Data

(63) Continuation of application No. 13/915,597, filed on Jun. 11, 2013, now Pat. No. 9,579,570, which is a (Continued)

(51) Int. Cl.
A63F 9/24 (2006.01)
H04W 8/00 (2009.01)
(Continued)

(52) U.S. Cl.
CPC ............. *H04W 8/005* (2013.01); *A63F 13/12* (2013.01); *A63F 13/213* (2014.09);
(Continued)

(58) Field of Classification Search
USPC ...................... 44/40–43; 370/349; 463/25–43
See application file for complete search history.

(56) References Cited

U.S. PATENT DOCUMENTS 7,085,814 B1    8/2006 Gandhi et al.
7,136,709 B2    11/2006 Arling et al.
(Continued)

FOREIGN PATENT DOCUMENTS

CN    102932428 A    2/2013
JP    11196345 A    7/1999
(Continued)

OTHER PUBLICATIONS

"First Office Action Issued in Australian Patent Application No. 2012322844", dated May 10, 2016, 6 Pages.
(Continued)

*Primary Examiner* — Masud Ahmed
(74) *Attorney, Agent, or Firm* — Davin Chin; Chin IP, PLLC

(57) ABSTRACT

Device linking is described. In one or more implementations, data is maintained at a network service that describes characteristics of a plurality of devices that are associated with a user account of the network service. A communication is formed to be received by one of the plurality of devices that includes a portion of the data that pertains to another one of the plurality of devices and that is suitable by the receiving device to discover the other one of the plurality of devices to initiate a local network connection between the devices.

20 Claims, 7 Drawing Sheets

Related U.S. Application Data continuation of application No. 13/291,354, filed on Nov. 8, 2011, now Pat. No. 8,469,816.

(60) Provisional application No. 61/545,947, filed on Oct. 11, 2011.

(51) Int. Cl.

| | |
|---|---|
| *A63F 13/327* | (2014.01) |
| *A63F 13/79* | (2014.01) |
| *A63F 13/323* | (2014.01) |
| *A63F 13/71* | (2014.01) |
| *A63F 13/30* | (2014.01) |
| *H04L 12/28* | (2006.01) |
| *H04L 29/08* | (2006.01) |
| *A63F 13/213* | (2014.01) |
| *A63F 13/215* | (2014.01) |

(52) U.S. Cl.
CPC .......... *A63F 13/215* (2014.09); *A63F 13/323* (2014.09); *A63F 13/327* (2014.09); *A63F 13/71* (2014.09); *A63F 13/79* (2014.09); *H04L 12/2809* (2013.01); *H04L 12/2829* (2013.01); *H04L 29/08576* (2013.01); *H04L 67/16* (2013.01); *H04L 67/18* (2013.01); *H04L 67/306* (2013.01); *A63F 2300/403* (2013.01); *A63F 2300/405* (2013.01); *A63F 2300/407* (2013.01); *A63F 2300/8017* (2013.01); *H04L 67/30* (2013.01)

(56) References Cited

U.S. PATENT DOCUMENTS

| | | | |
|---|---|---|---|
| 7,231,592 | B2 | 6/2007 | Humpleman et al. |
| 7,274,684 | B2 | 9/2007 | Young et al. |
| 7,650,151 | B2 | 1/2010 | Medepalli et al. |
| 7,796,023 | B2 | 9/2010 | Rezvani et al. |
| 7,841,945 | B2 * | 11/2010 | Kamikawa et al. ............ 463/42 |
| 7,940,778 | B2 | 5/2011 | Ding et al. |
| 8,262,482 | B2 * | 9/2012 | Kamikawa et al. ............ 463/42 |
| 8,469,816 | B2 | 6/2013 | Liu et al. |
| 8,937,534 | B2 | 1/2015 | Kreiner et al. |
| 2002/0122410 | A1 * | 9/2002 | Kulikov et al. ............ 370/349 |
| 2003/0055867 | A1 | 3/2003 | King |
| 2003/0064805 | A1 * | 4/2003 | Wells ............ 463/39 |
| 2005/0159221 | A1 * | 7/2005 | Kamikawa et al. ............ 463/42 |
| 2005/0221897 | A1 * | 10/2005 | Oe ............ 463/42 |
| 2006/0004743 | A1 | 1/2006 | Murao et al. |
| 2006/0168541 | A1 | 7/2006 | Hill et al. |
| 2006/0245403 | A1 | 11/2006 | Kumar |
| 2006/0277566 | A1 | 12/2006 | Vince et al. |
| 2007/0067431 | A1 | 3/2007 | Yoshihara et al. |
| 2007/0093294 | A1 * | 4/2007 | Serafat et al. ............ 463/39 |
| 2007/0296552 | A1 | 12/2007 | Huang et al. |
| 2008/0113614 | A1 | 5/2008 | Rosenblatt |
| 2009/0092133 | A1 | 4/2009 | Mok et al. |
| 2009/0170519 | A1 | 7/2009 | Wilhoite et al. |
| 2009/0248797 | A1 | 10/2009 | Chiba et al. |
| 2010/0069158 | A1 | 3/2010 | Kim |
| 2010/0081375 | A1 | 4/2010 | Rosenblatt et al. |
| 2010/0202365 | A1 | 8/2010 | Bambic et al. |
| 2010/0235422 | A1 | 9/2010 | Perret |
| 2010/0302958 | A1 | 12/2010 | Wietfeldt et al. |
| 2011/0065511 | A1 * | 3/2011 | Mahan et al. ............ 463/40 |
| 2012/0146918 | A1 | 6/2012 | Kreiner et al. |
| 2013/0088419 | A1 | 4/2013 | Kim et al. |
| 2013/0090169 | A1 | 4/2013 | Liu et al. |
| 2014/0162625 | A1 | 6/2014 | Zhao et al. |

FOREIGN PATENT DOCUMENTS

| | | |
|---|---|---|
| JP | 2002015151 A | 1/2002 |
| JP | 2009251648 A | 10/2009 |
| KR | 20050048414 | 5/2005 |
| WO | 1996041472 A1 | 12/1996 |
| WO | 2009135312 A1 | 11/2009 |

OTHER PUBLICATIONS

"Foreign Notice of Allowance", TW Application No. 101132764, Apr. 14, 2015, 4 pages.
"Foreign Office Action", CN Application No. 201210382719.7, dated Apr. 29, 2015, 13 pages.
"Foreign Office Action", CN Application No. 201210382719.7, dated Sep. 1, 2014, 12 pages.
"Foreign Office Action", EP Application No. 12840708.7, dated Feb. 4, 2015, 6 pages.
"Foreign Office Action", EP Application No. 12840708.7, dated Jul. 10, 2015, 7 pages.
"Foreign Office Action", TW Application No. 101132764, dated Oct. 8, 2014, 8 pages.
"Non-Final Office Action", U.S. Appl. No. 13/291,354, (dated Nov. 20, 2012), 6 pages.
"Notice of Allowance Issued in Chinese Application No. 201210382719.7", dated Apr. 21, 2016, 4 Pages.
"Notice of Allowance Issued in Mexican Patent Application No. MX/a/2014/004483", dated Jun. 10, 2016, 1 Page.
"Notice of Allowance", U.S. Appl. No. 13/291,354, (dated Feb. 12, 2013), 9 pages.
"Office Action Issued in Japanese Patent Application No. 2014-535825", dated Oct. 3, 2016, 9 Pages.
"Office Action Issued in Russian Patent Application No. 2014114269", dated Nov. 8, 2016, 4 Pages.
"Patent Examination Report No. 2" in Australian Patent Application No. 2012322844, dated Aug. 1, 2016, 5 Pages.
"Patent Examination Report No. 3" in Australian Patent Application No. 2012322844, dated Oct. 24, 2016, 4 Pages.
"PCT Search Report and Written Opinion", Application No. PCT/US2012/059621, (dated Mar. 12, 2013), 8 pages.
"Supplementary European Search Report", EP Application No. 12840708.7, dated Jan. 21, 2015, 3 pages.
"Third Office Action and Search Report Issued in Chinese Patent Application No. 201210382719.7", dated Nov. 19, 2015, 12 Pages.
"Universal Plug and Play Device Architecture", UPnP, Version 1.0, Jun. 8, 2000, 54 pages.
Pering, Trevor et al., "Exploiting Radio Hierarchies for Power-Efficient Wireless Device Discovery and Connection Setup", VLSID '05, Jan. 3-7, 2005, (Jan. 3, 2005), 6 pages.
Supplementary European Search Report dated Feb. 4, 2015 in EP Application No. 12840708.7, 6 pages.
"Notice of Acceptance of Patent Application" in Australian Patent Application No. 2012322844, dated Feb. 8, 2017, 3 Pages.
"Decisionon Rejection Issued in Japanese Patent Application No. 2014-535825", dated May 22, 2017, 4 Pages.
"Final Office Action Issued in U.S. Appl. No. 13/915,597", dated May 8, 2015, 9 Pages.
"Non-Final Office Action Issued in U.S. Appl. No. 13/915,597", dated Jan. 4, 2016, 7 Pages.
"Non-Final Office Action Issued in U.S. Appl. No. 13/915,597", dated Nov. 26, 2014, 6 Pages.
"Notice of Allowance Issued in U.S. Appl. No. 13/915,597", dated Sep. 23, 2015, 13 Pages.
"Notice of Allowance Issued in U.S. Appl. No. 13/915,597", dated Jun. 20, 2016, 5 Pages.
"Notice of Allowance Issued in U.S. Appl. No. 13/915,597", dated Sep. 30, 2016, 7 Pages.
"Notice of Allowance Issued in Russian Patent Application No. 2014114269", dated Jun. 9, 2017, 10 Pages. (W/o English Translation).
"Notice of Allowance Issued in Japanese Patent Application No. 2014-535825", dated Oct. 20, 2017, 4 Pages.

* cited by examiner

DEVICE LINKING

RELATED APPLICATIONS

This application is a continuation of and claims priority to U.S. patent application Ser. No. 13/915,597, filed Jun. 11, 2013 and titled "Device Linking," which is a continuation of and claims priority to U.S. patent application Ser. No. 13/291,354, filed Nov. 8, 2011 and titled "Device Linking," which claims priority under 35 U.S.C. Section 119(e) to U.S. Provisional Patent Application No. 61/545,947, filed Oct. 11, 2011 and titled "Device Linking". The entire disclosure of each application is hereby incorporated by reference.

BACKGROUND

Users may interact with a variety of different devices in a given day. For example, a user may interact with a desktop PC, a laptop computer, a mobile communication device (e.g., a mobile phone), a game console, and so on. Traditional interaction with the devices, however, was often disjointed such that interaction with one device was divorced from interaction with another device. Further, even though techniques were subsequently developed in an attempt to rectify this problem, these techniques were often complicated and inefficient and therefore users typically chose to forgo this functionality.

SUMMARY

Device linking is described. In one or more implementations, data is maintained at a network service that describes characteristics of a plurality of devices that are associated with a user account of the network service. A communication is formed to be received by one of the plurality of devices that includes a portion of the data that pertains to another one of the plurality of devices and that is suitable by the receiving device to discover the other one of the plurality of devices to initiate a local network connection between the devices.

In one or more implementations, data is received at a computing device, which is associated with a user account, from a network service that identifies another computing device associated with the user account. Responsive to a determination by the computing device that the other computing device is available via a local network connection, the local network connection is formed by the computing device with the other computing device. Responsive to a determination by the computing device that the other computing device is not available via a local network connection, a non-local network connection is formed by the computing device with the other computing device.

In one or more implementations, availability is discovered, through communication with a network service, of a device to support a companion experience, the availability determined through association of the device with a user account. Data received from the network service is used to initiate a local network connection between the computing device and the device as a result of the discovering that is usable to communicate data involved in the companion experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Traditional techniques that were utilized to link devices together typically involve a multitude of manual steps to be performed by the user. Further, these steps were often complicated and therefore users traditionally did not avail themselves of these techniques, even when available.

Device linking techniques are described. In one or more implementations, techniques are described in which different types of devices may work in conjunction, such as use of a mobile communications device to support interaction with a game console. A variety of techniques are discussed herein that may be leveraged to link the devices together, such as to support this interaction. Examples of this include leveraging use of the "cloud" and a local connection to perform the setup, use of local and remote connections, support of fallback functionality, and so on. Further discussion of this and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
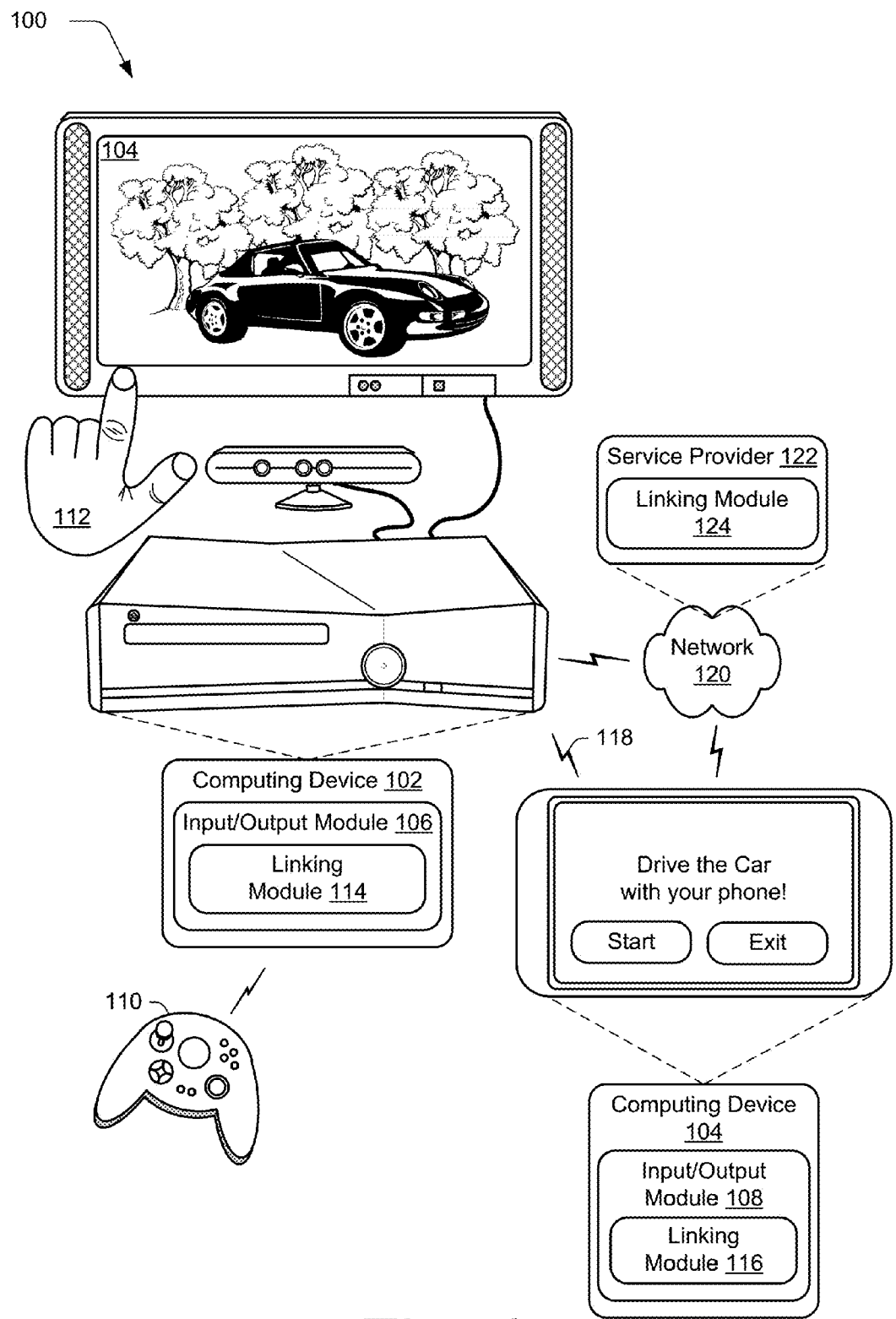
FIG. 1 is an illustration of an environment in an example implementation that is operable to perform device linking techniques described herein.

FIG. 1 is an illustration of an environment 100 in an example implementation that is operable to employ techniques described herein. The illustrated environment 100 includes examples of two computing devices 102, 104 that may be configured in a variety of ways. The computing devices 102, 104, for instance, may be configured as a traditional computer (e.g., a desktop personal computer, laptop computer, and so on), a mobile station, an entertainment appliance, a game console communicatively coupled to a display device (e.g., a television, a mobile communication device (e.g., a wireless phone, a tablet), a netbook, and so forth as further described in relation to the example operating environment and device. Thus, the computing devices 102, 104 may range from full resource devices with substantial memory and processor resources (e.g., personal computers, game consoles) to low-resource devices with limited memory and/or processing resources (e.g., traditional set-top boxes, hand-held game consoles). In the illustrated implementation the computing device 102 is configured as a game console and the other computing device 104 is configured as a mobile communication device, although other implementations are also contemplated as described above.

The computing devices 102, 104 are each illustrated as including an input/output module 106, 108, respectively. The input/output modules 106, 108 are representative of functionality relating to recognition of inputs and/or provision of outputs by the respective computing device. For example, the input/output modules 106, 108 may be configured to receive inputs from a keyboard, mouse, to identify gestures and cause operations to be performed that correspond to the gestures, and so on. The inputs may be detected by the input/output modules 106, 108 in a variety of different ways.

The input/output module 106 for instance, may be configured to receive one or more inputs via touch interaction with a hardware device, such as a controller 110 as illustrated. Touch interaction may involve pressing a button, moving a joystick, movement across a track pad, use of a touch screen of the display device (e.g., detection of a finger of a user's hand or a stylus by the computing device 102), and so on.

Recognition of the inputs may be leveraged by the input/output modules 106, 108 to interact with a user interface output by the respective computing device 102, 104 such as to interact with a game, an application, browse the internet, change one or more settings of the computing devices 102, 104, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102 as illustrated by computing device 104), and other devices that involve touch on the part of a user or object.

A natural user interface (NUI) may also be supported by the input/output modules 106, 108, such as to recognize interactions that may not involve touch. For example, the computing devices 102, 104 may leverage input devices to detect inputs without having a user touch a particular device, such as to recognize audio inputs through use of a microphone. For instance, the input/output modules 106, 108 may be configured to perform voice recognition to recognize particular utterances (e.g., a spoken command) as well as to recognize a particular user that provided the utterances.

In another example, the input/output modules 106, 108 that may be configured to recognize gestures, presented objects, images, and so on through use of a camera. The camera, for instance, may be configured to include multiple lenses so that different perspectives may be captured and thus determine depth as shown for computing device 102 in the game console configuration. The different perspectives, for instance, may be used to determine a relative distance from the input device and thus a change in the relative distance. The different perspectives may be leveraged by the respective computing devices 102, 104 as depth perception. Naturally, other images may also be leveraged without use to depth sensing, such as a camera of the computing device 104 as configured as a mobile communications device. The images may be leveraged to provide a variety of functionality, such as techniques to identify particular users (e.g., through facial recognition), objects, perform searches, and so on.

The input-output modules 106, 108 may leverage the inputs to perform skeletal mapping along with feature extraction of particular points of a human body (e.g., 48 skeletal points) to track one or more users (e.g., four users simultaneously) to perform motion analysis. For instance, captured images may be analyzed by the input/output modules 106, 108 to recognize one or more motions made by a user, including what body part is used to make the motion as well as which user made the motion. An example is illustrated through recognition of positioning and movement of one or more fingers of a user's hand 112 and/or movement of the user's hand 112 as a whole. The motions may be identified as gestures by the input/output modules 106, 108 to initiate a corresponding operation.

The computing devices 102, 104 are further illustrated as including respective linking modules 114, 116. The linking modules 114, 116 are representative of functionality of the respective devices to initiate and manage one or more network connections between the devices. The connections may be used to support a variety of different functionality, such as a companion experience. For example, the computing device 104 configured as a mobile communications device may interact with the computing device 102 configured as a game console to supplement the user experience. This may include use of the computing device 104 as a game controller, output of an electronic program guide to control an output of broadcast content by the computing device 102, and so on. Thus, interaction with the computing device 104 may be used to control one or more operations performed by the computing device 102 and vice versa. The computing device 102, for instance, may provide supplemental content for output by the computing device 104.

The linking modules 114, 116 may include a variety of different functionality to initiate and manage the network connections. For example, the linking modules 114, 116 may include functionality to form a local network connection 118 between the devices (e.g., a local Wi-Fi connection) and/or a remote connection involving a network 120, e.g., "over the cloud" by leveraging a service provider 122 that is accessible via the Internet. Accordingly, in this second example the service provider 122 is also illustrated as including a linking module 124 which is representative of functionality of the service provider 122 to also support device linking functionality.

The linking modules 114, 116, for instance, may leverage the remote connection of the network 120 to contact the service provider 120 to perform device discovery, e.g., "locate" a device with which to communicate. This data may then be used to set-up a local network connection 118 between the devices to support the companion experience as described earlier. In another example, this connection may be maintained in whole or in part over a remote connection involving the network 120, e.g., the Internet or other wide area network. Thus, the linking modules 114, 116 may leverage a variety of different types of connections and techniques to form the connections, further discussion of which may be found in relation to the following figure.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing devices 102, 104 may also include an entity (e.g., software) that causes hardware of the computing devices 102, 104 to perform operations, e.g., processors, functional blocks, and so on. For example, the computing devices 102, 104 may include a computer-readable medium that may be configured to maintain instructions that cause the computing device, and more particularly hardware of the computing devices 102, 104 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
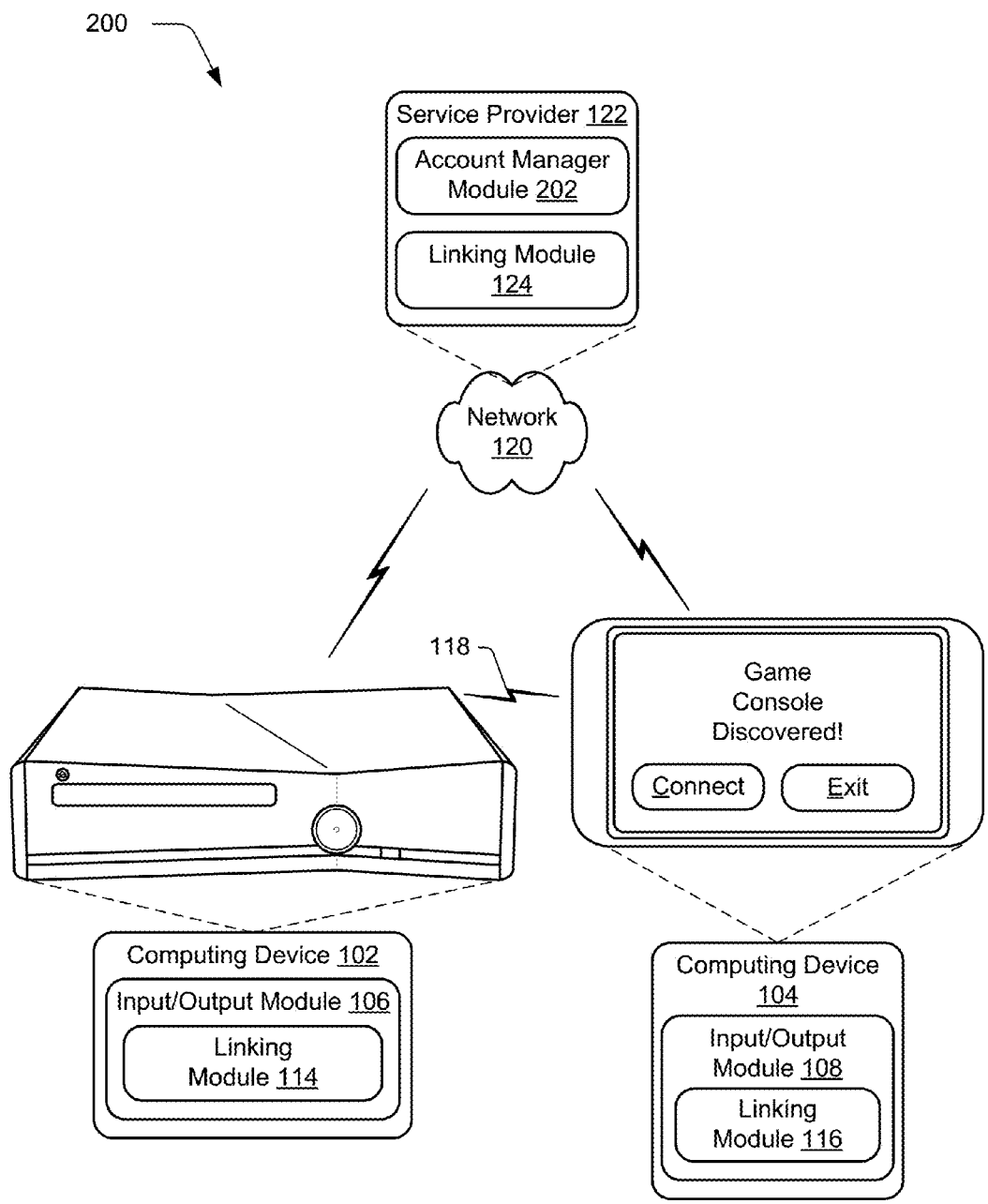
FIG. 2 is an illustration of a system in an example implementation showing the computing devices and service provider of FIG. 1 in greater detail.

FIG. 2 illustrates a system 200 showing the computing devices 102, 104 and service provider 122 in greater detail. Connections to support a companion experience between the computing devices 102, 104 may be initiated and maintained in a variety of ways. For example, each of the computing devices 102, 104 may be associated with a user account of a network service of the service provider 122. Therefore, users may simply login to the user account of the service provider 122 by providing credentials via the network 120 without involving extra login information, key codes, and so forth. These credentials may then be processed by an account manager module 202 of the service provider 122 to authenticate the user. Further, this authentication may be used to access a variety of different services of the service provider 122 (and other service providers) through a "one-time" login, such as a music service, messaging service, calendaring service, contact service, and so forth.

Once authenticated, functionality of the linking module 124 may be exposed, such as to form a connection between the devices. The linking module 124, for instance, may be configured to maintain data that describes network connection details that may be utilized to form a network connection between the devices. This may include data that describes local network connection 118 details, such as to support a Wi-Fi connection through use of an identifier, network name, and so on. This data may also describe remote connection details for access via the network 120 (e.g., the Internet), such as an IP address, bandwidth supported, location information, network access type, and so on.

The data may be communicated to the service provider 122 in a variety of ways and at a variety of times. For example, the data may be communicated as part of authentication, may be stored from a previous communication, may be provided in response to a request received from the service provider 122 (e.g., after authentication has been achieved), and so on. Thus, the linking modules 114, 116 may communicate a variety of different data that may be leveraged to form a connection.

In one or more implementations, settings may be exposed on the respective linking modules 114, 116 to control whether to provide this data. For example, a configuration setting may be exposed to make the respective computing device discoverable, which may be set "on" as a default although other examples are also contemplated.

Additionally, another configuration setting may be used to control whether the computing device is to maintain a live connection with the service provider 122, which may be set to "off" as a default. This may be used to reduce resource consumption (e.g., by the network 120 and/or service provider), such that the service provider 122 is not forced to maintain the device connection feature for devices that do not wish to do so. For example, this setting may be set to "off" initially. However, once a connection is attempted this setting may be switched to "on" automatically and without user intervention to maintain a "ready" open connection to perform the linking described herein.

To initiate a connection, the computing devices 102, 104 may first "discover" each other in a variety of ways. For example, the linking modules 114, 116 may be configured to first determine whether another device is available via the local network connection 118, such as available via a Wi-Fi, Bluetooth, or other wired or wireless network. This discovery may be configured to leverage data previously stored by the respective linking modules 114, 116, such as identification of particular network identifiers of the respective computing devices 102, 104, networks, and other information, although other examples are also contemplated.

If a device is not so discovered, the linking modules 114, 116 may communicate with the service provider 112 to discover if another device is available for a connection. The computing devices 102, 104, for instance, may communicate data that indicates a location of the devices, data that is usable to discover the devices over a local connection, and so on. The data may indicate a particular location, such as in a particular room, leverage GPS coordinates, and other position-determination functionality. Further, this information may be used to determine a type of connection to establish, such as to establish a remote connection via the network 120 when a local network connection 118 is not available, e.g., the devices are located apart at a distance that is greater than that supported by the local network connection 118.

For example, the computing device 104 may communicate with the linking module 124 of the service provider 122 via the network 120 to determine whether other devices (e.g., computing device 102) that are registered with the user's account are available for linking. The service provider 122 may then return an answer, which may include additional local network connection information (e.g., wireless or wired subnet) for those devices. The linking module 116 of the computing device 104 may then search the local network to try to find the other device or devices using that information. If found, the computing devices 102, 104 may negotiate a direct link via a local network connection 118 to communicate, which may support more efficient communication than that supported via the network 120 in one or more instances. For instance, the local network connection 118 may support a higher bandwidth than a remote connection via network 120. Further, cost considerations may also be utilized as part of a decision process regarding which network to use, e.g., a Wi-Fi network versus a mobile phone network that has a usage cap.

If not found, the computing devices 102, 104 may communicate via the network 120 in a variety of ways. For example, communications may pass through the service provider 122 as an intermediary. Thus, the communications in this example may leverage the internet or other wide area network to connect the devices, one to another. In another example of a remote connection, tunneling techniques may be supported to pass the communications, such as by leveraging IP addresses of the other devices by the respective linking modules 114, 116 to communicate directly via the network 120 without having the service provider 122 actively work as an intermediary.

A variety of other examples are also contemplated, such as a hybrid mode in which different communications are passed via different networks. For example, such a hybrid mode may be used to support communication of commands via the network 120 and content via the local network connection 118 and vice versa. This division of communications may be performed for a variety of reasons, such as due to limitations in a topology of specific network connections supported by the respective networks.

In some instances, characteristics of a network connection may change during usage. Accordingly, the linking modules 114, 116, 124 may be configured in a variety of different ways to address these changes. For example, the linking modules 114, 116, 124 may be configured to notify a user (e.g., via a user interface) of this change. Additionally, the linking modules 114, 116, 124 may be configured to adjust (e.g., disable) features that may not work well in this state, such as to reduce a resolution, functionality that is communication intensive, features that are not supported by that network, and so on.

Further, the linking modules 114, 116, 124 may be configured to cache commands, which may be used to improve efficiency and handle intermittent connection issues. This caching may be performed at the computing devices 102, 104 as well as at the service provider 122. A variety of other examples are also contemplated.

For example, the linking modules 114, 116, 124 may be configured to support automatic fallback recovery. The local network connection 118, for instance, may degrade or become disconnected, such as due to movement of the computing device 104 away from computing device 102, network interference, and so on. In such instances, the linking modules 114, 116, 124 may cause a connection to be achieved via the network 120, instead, may decide to employ a hybrid format as previously described, and so on. The reverse is also true in that if reliability of the network 120 decreases the local network connection 118 may be leveraged automatically and without user intervention to support communication between the devices.

This change may also be used to switch networks responsive to a determination that another one of the networks has become available. For example, computing device 104 may initially communicate with computing device 102 over the Internet, such as when the computing device 104 is positioned at a distance at which the local network connection 118 is not supported. Responsive to a determination that the computing device 104 is now within local network range of the computing device 102, the linking modules 114, 116 may automatically communicate over the local network connection 118. As previously described, a variety of considerations may be taken into account in use of this functionality, such as cost considerations described above. Thus, a variety of different functionality may be leveraged to support device linking, which may also be used to support a variety of additional functionality such as a companion experience as previously described.

A variety of other functionality may also be supported by the linking modules 114, 116, 124. For example, as described above the connection may be bi-direction such that each of the devices may send and receive data from other devices. This functionality may be leveraged in a variety of ways. Computing device 102, for instance, may be configured to inform computing device 104 as to a current state in an output of content. Computing device 104 may then leverage this information to provide functionality, such as to locate related content, perform an Internet search based on one or more scenes associated with the related content, and so forth. The reverse is also true in that computing device 104 may communicate a state to computing device 102, which may be leveraged by the device to support functionality, such as to continue playback of content at a current point by computing device 102 that corresponds to an output of content by computing device 104.

In another example, the linking modules 114, 116, 124 may also support a variety of different encryption methods to protect communications, both via the local network connection 118, remotely via the network 120, and so on. Further, although the internet was described in relation to network 120, a variety of different types of networks may also be supported by the techniques, such as with a single domain, as part of an enterprise, an intranet, and so on. Further discussion of device linking techniques may be found in relation to the following procedures.

Example Procedures

The following discussion describes device linking techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
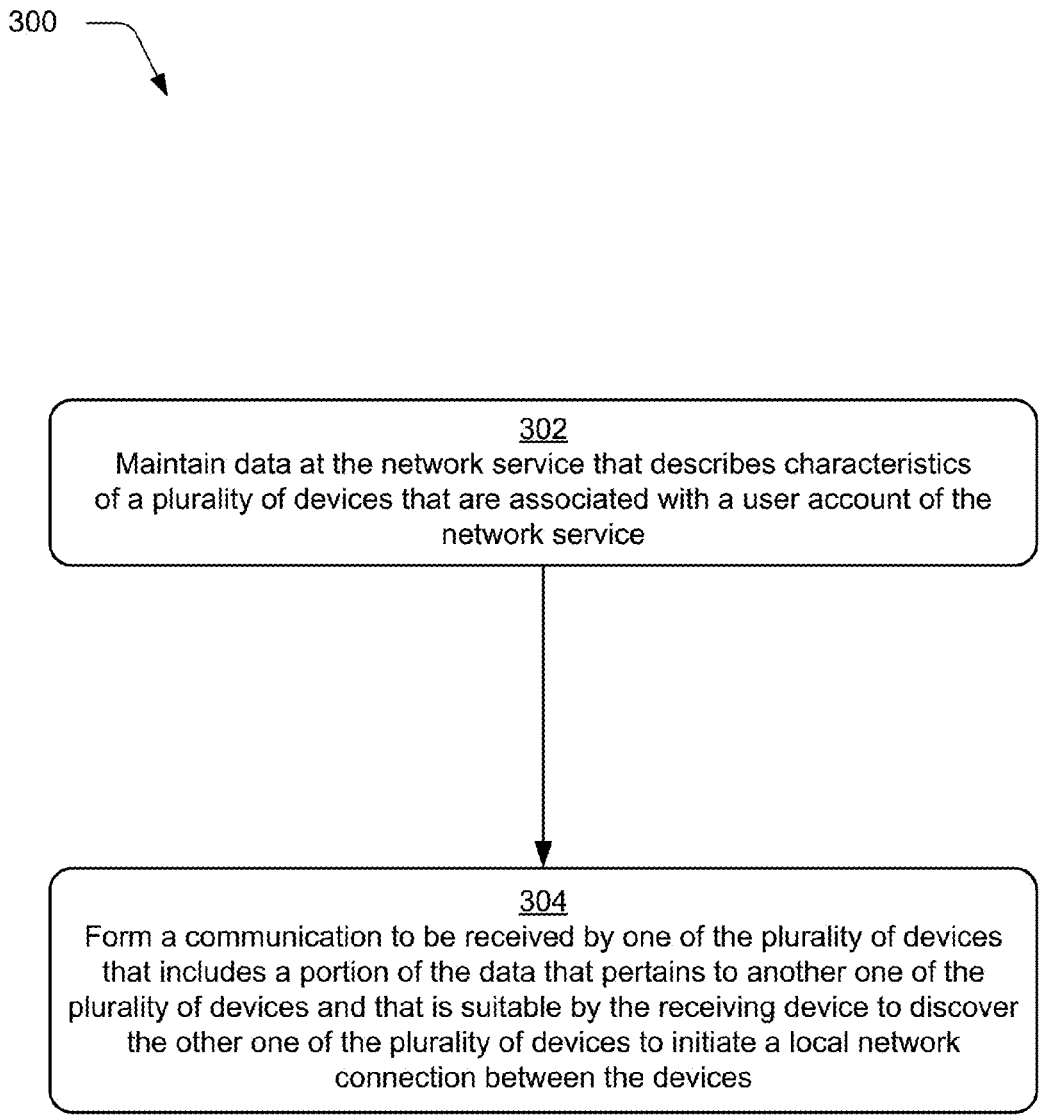
FIG. 3 is a flow diagram that depicts a procedure in an example implementation in which a network service is configured to broker connections between devices.

FIG. 3 is a flow diagram that depicts a procedure 300 in an example implementation in which a network service is configured to broker connections between devices. Data is maintained at a network service that describes characteristics of a plurality of devices that are associated with a user account of the network service (block 302). The linking module 124 of the service provider 122, for instance, may receive data from the computing devices 102, 104 that are associated with a user's account. This data may be received responsive to selection of a setting at the respective devices to permit discovery of the device.

A communication is formed to be received by one of the plurality of devices that includes a portion of the data that pertains to another one of the plurality of devices and that is suitable by the receiving device to discover the other one of the plurality of devices to initiate a local network connection between the devices (block 304). The communication, for instance, may include data usable to locate the devices locally, e.g., a wired or wireless subnet via which the other device is accessible via the local network connection. The communication may also include data usable to locate the devices remotely, such as an IP address. This data may then be used to form connections that may be used to support a variety of functionality, such as a companion experience as described earlier.

Figure 4:
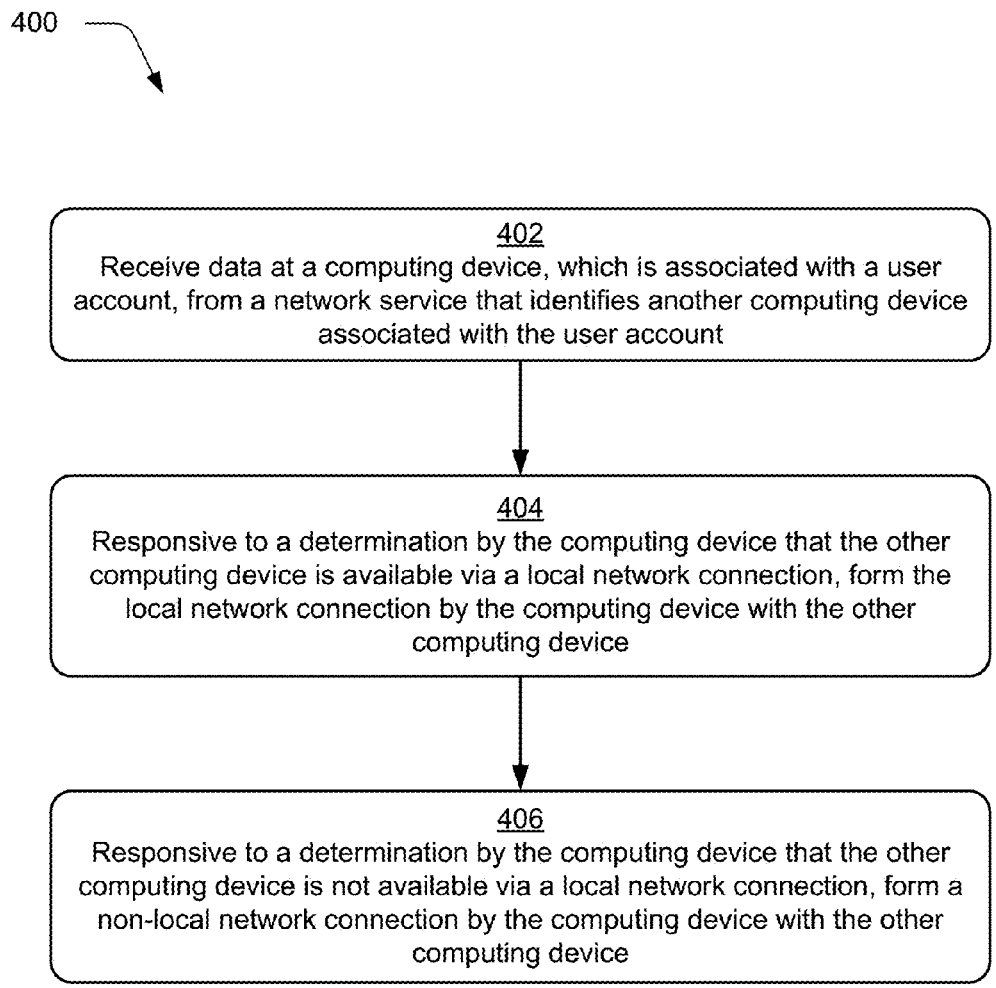
FIG. 4 is a flow diagram that depicts a procedure in an example implementation in which a computing device is configured to leverage local and/or remote network connections to communicate with another computing device.

FIG. 4 is a flow diagram that depicts a procedure 400 in an example implementation in which a computing device is configured to leverage local and/or remote network connections to communicate with another computing device. Data is received at a computing device, which is associated with a user account, from a network service that identifies another computing device associated with the user account (block 402). As described earlier, the data may describe the device in a variety of ways, such as through a network address, name of the device, and so on.

Responsive to a determination by the computing device that the other computing device is available via a local network connection, the local network connection is formed by the computing device with the other computing device (block 404). The computing device 102, for instance, may form a local wireless connection (e.g., Wi-Fi) with computing device 104, if available.

Responsive to a determination by the computing device that the other computing device is not available via a local network connection, a non-local network connection is formed by the computing device with the other computing device (block 406). Continuing with the previous example, if the computing device 104 is not available via the local network connection 118, the computing device 102 may form a network connection via the network 120, e.g., the Internet or other wide area network. A variety of other examples are also contemplated.

Figure 5:
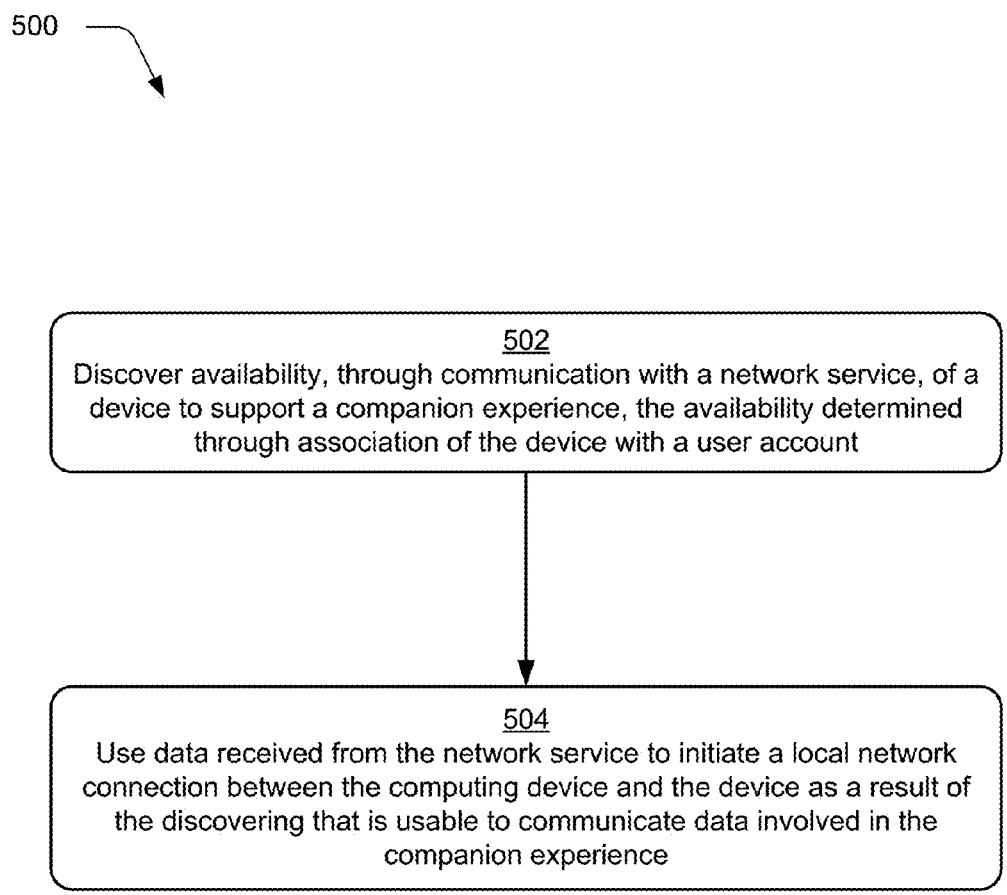
FIG. 5 is a flow diagram that depicts a procedure in an example implementation in which a companion experience is supported through device linking.

FIG. 5 is a flow diagram that depicts a procedure 500 in an example implementation in which a companion experience is supported through device linking Availability is discovered, through communication with a network service, of a device to support a companion experience, the availability determined through association of the device with a user account (block 502). Computing device 104 configured as a mobile communications device (e.g., a wireless phone), for instance, may communicate with the service provider 122 to determine whether a device is available, such as computing device 102 configured as a game console.

Data received from the network service is used to initiate a local network connection between the computing device and the device as a result of the discovering that is usable to communicate data involved in the companion experience (block 504). The computing device 104, for instance, may receive data described a wired or wireless subnet via which computing device 102 is available. A variety of other examples are also contemplated, examples of which may be found in relation to the following implementation example.

Implementation Example

The following describes an implementation example of the techniques described previously. In one or more companion experience scenarios, a user may be able to use a device to browse the video catalog and so on and then pick a movie, rent it and play it on the console. During the movie, the user may be able to control it, for example, play/pause, fast forward and rewind and so on using a mobile communications device or other device. A game console may also be configured to notify the device about things happening on the console, like current movie state, title change on the console etc. From the device, the user may be able to launch a title on the console, e.g., to get the title ID of the title running on the console.

In terms of communication between the devices, message exchanges may fall into a variety of categories, examples of which include:

Operations: How do I trigger work on another device?
Notifications: How do I get notified of state changes on another device?

There are a variety of notifications that may occur in the system:

Active Title Changed: A new title has been launched. This notification occurs when a new title is launched on the console, either via controller input or companion commands.

Media State Change: Some aspect of playhead state has changed, such as content ID, playback rate, playhead position, or playing/paused state. This notification happens both periodically to keep position variables synchronized across devices, as well as instantaneously whenever a change occurs based on user input (e.g., the stop button was pressed).

There are a variety of operations that can be issued in the system:

Launch Title: Launch a console title, optionally with a command line argument used to indicate which piece of media content to display. This command may be issued by the companion device (also referred to as a "companion" in the following discussion) when a new piece of content is selected from the guide or search results.

Get Active Title: Query the console for the currently running title. This may be called when the companion first connects to the console to acquire the initial title ID, as well as whenever the client explicitly refreshes this information (for example, returning from sleep). The result of this command contains the same information as an Active Title Changed notification.

Send Input: Send an input command to the console. This command is issued by the companion whenever a transport control (e.g., play, pause, stop) is clicked.

Get Media State: Query the console for the current media state. This is called when the companion first connects to the console to acquire the initial media state, as well as whenever the client needs to explicitly refresh this information (for example, returning from sleep). The result of this command contains the same information as a Media State Changed notification.

Media State

The primary data structure in this example that is used in both protocol and APIs is the media state structure. This structure represents the current play head state and content ID that is playing within a media application/title. Media State may be derived from the console Media APIs and includes the following fields/properties:

| Name | Datatype | Description |
| --- | --- | --- |
| duration | Unsigned 64-bit Integer | Total duration of content in 100 ns units |
| minSeek | Unsigned 64-bit Integer | Minimum seek position in 100 ns units |

-continued

| Name | Datatype | Description |
| --- | --- | --- |
| maxSeek | Unsigned 64-bit Integer | Maximum seek position in 100 ns units |
| position | Unsigned 64-bit Integer | Current playback position in 100 ns units |
| fRate | 32-bit floating point number | Current playback rate (1.0 f is normal play) |
| eTransportState | ScourTransportState (see below) | Current transport state (e.g., play, pause, etc.) |
| eTransportCapabilities | TransportCapabilities (see below) | Which transport controls are supported by the current playback application/content |
| MediaAssetId | UTF-8 Text (256 bytes max) | Text-based identifier of current content. |

ScourTransportState is an enumeration taken from the console media APIs:

```
enum ScourTransportState
{
  // Undefined
  SCOURTRANSPORTSTATE_INVALID = 0,
  // Stop was received or end of content was reached
  SCOURTRANSPORTSTATE_STOPPED = 1,
  // Play/unpause was received but playback has not yet started.
  SCOURTRANSPORTSTATE_STARTING = 2,
  // Content is currently playing
  SCOURTRANSPORTSTATE_PLAYING = 3,
  // Pause was received and playback is suspended until a play/unpause
  // is received
  SCOURTRANSPORTSTATE_PAUSED = 4,
  // Content buffering has occurred and playback is suspended until
  // buffering has ended
  SCOURTRANSPORTSTATE_BUFFERING = 5,
};
```

An additional enumeration value to indicate that no media is playing (e.g., a game is running) may be configured as follows:
//No media is playing
SCOURTRANSPORTSTATE_NOMEDIA=−1,
When this value is used, the remaining fields of the media state are undefined.

TransportCapabilities is a flags enumeration that indicates what operations the media player may perform:

```
  enum TransportCapabilities
  {
    // Can respond to SendInput(Stop)
    TRANSPORTCAPABILITIES_CANSTOP = 0x1,
    // Can respond to SendInput(Pause)
    TRANSPORTCAPABILITIES_CANPAUSE = 0x2,
    // Can respond to SendInput(Rewind)
    TRANSPORTCAPABILITIES_CANREWIND = 0x4,
    // Can respond to SendInput(FastForward)
    TRANSPORTCAPABILITIES_CANFASTFORWARD = 0x8,
    // Can respond to SendInput(Play)
    TRANSPORTCAPABILITIES_CANPLAY = 0x10,
    // Can respond to SendInput(TogglePlayPause)
    TRANSPORTCAPABILITIES_CANPLAYPAUSE = 0x20,
    // Can respond to SendInput(SkipForward)
    TRANSPORTCAPABILITIES_CANSKIPFORWARD = 0x40,
    // Can respond to SendInput(SkipBackward)
    TRANSPORTCAPABILITIES_CANSKIPBACKWARD = 0x80,
    // Can respond to SendInput(Seek, Positon)
    TRANSPORTCAPABILITIES_CANSEEK = 0x100,
    // TODO, grant: ???
    TRANSPORTCAPABILITIES_ISLIVETRANSPORT = 0x200,
  }
```

Communication

The communication stack used to enable companion scenarios may combine local low-latency TCP and UDP messaging with a cloud-based service to support security and device discovery as well as communication between devices that do not have line-of-sight IP connectivity.

Communication may be coordinated through the cloud, e.g., a network service. The console registers with the companion service in order to be discovered by companion devices. The companion device uses the companion service to determine with which device it may communicate. If there is line-of-sight IP connectivity between the console and the companion device, subsequent communication between that device and the console may happen over local TCP and UDP messaging without service intervention. If there is no line-of-sight IP connectivity between the console and the companion device, communication may happen via the companion service, albeit at a higher latency. The companion application may adapt its user interface based on whether a low-latency communication stack is available, disabling features that "do not make sense" when relying on cloud-based messaging.

Device discovery/pairing/authorization may happen through the companion service. The system may perform this as follows:
 1. companion devices use an authenticated network ID that corresponds to a Login ID.
 2. A given device communicates with the console that the current user on that device is logged into. Guest pairing/authorization using invitation codes or other more advanced user interface may also be supported.

The console may re-register with the companion service when the set of logged on users changes. Part of this registration may include a set of active users, an IP address of the console, and the TCP port being used to listen for local companion commands. Upon registering, the companion service may return a secure session key that the console can use to securely sign and encrypt messages on the local subnet.

When the companion device attempts to join a session, it contacts the companion service, which then returns both the network address of the console the current user is logged into, as well as the secure session key that can be used to sign and seal messages on the local subnet.

Communication with the service may be performed over HTTPS. If line-of-sight IP connectivity is available, subsequent communication may take place using the TCP/IP for commands (using the TCP/IP address of the console), and UDP broadcast for notifications (using the IP subnet address of the console). If line-of-sight IP connectivity is not available, subsequent communications may take place via the companion service.

In one or more implementations, it is possible that TCP connectivity to the console is possible, but UDP broadcast to the device is not due to the console and companion device being separated by an IP router. In that case, the companion device may receive notifications via the companion service but still issue commands (and receive their responses) over direct TCP to the console.

Security

In addition to the security provided by the local-subnet (e.g., WEP or WPA over Wi-Fi), communication in the system may be secured as follows.

Companion Device to Companion Service

Communication between the companion device and the service may be performed over HTTPS, which may be authenticated using a network ID that corresponds to a valid console ID. The mobile communications device, for instance, may acquire an authentication (e.g., SAML) token from a linking service such as XBL, which it then presents to the companion service. The companion service then issues one or more security tokens for subsequent calls to the service. For example, a token may be used of subsequent calls to the service and another token may be used for the console and the mobile communication device to authenticate the messages.

Console to Companion Service

Communication between the console and the service may be performed over HTTPS. When the set of logged in XBL users on the console changes, the console may acquire a SAML token from XBL, which it then presents to the companion service. The companion service then issues a security token for subsequent calls to the service.

Companion Device to/from Console

Once the companion device or console have authenticated against the companion service, the devices may then establish a secure session to communicate, one with another. A session may be thought of as a secure context that multiple devices can use to communicate. Each session may have:

1. A session ID (guid) that is tracked by the service that uniquely identifies this communication session.
2. A 128-bit session key that is used to sign and encrypt messages that are sent over the local subnet.

Whenever the set of logged on users changes on the console, the console may re-authenticate with the companion service, and, if a previous user has logged off, a new session key may be generated for that session.

Messages sent between devices on the local subnet may be integrity protected and encrypted. Integrity protection may be provided using HMAC-SHA1, while encryption may be performed using AES-128 in CBC mode. Replay protection may be implemented using sequence numbers. The receiver may maintain a 'high water mark' number and reject messages with a lower number.

Console Implementation

The majority of the communication stack for companion may be implemented in the console operating system, with a minimal API set exposed to titles.

Console API

The companion API may be called by titles. The API may be referred to as "LrcSetMediaState." LrcSetMediaState is called by media player titles to communicate that the playhead state or content ID has changed. This function may be called:

1. In response to an explicit change in content ID (e.g., changing from playing a first movie to playing a second movie within the same console title/app)
2. In response to processing a transport control request (e.g., stop was pushed, playrate was changed due to FF/REW).
3. Periodically as playhead state advances due to normal playback, including reaching the end of stream or buffering beginning or ending.

The implementation of this API may cache the data passed in the last call in order to satisfy subsequent requests for playhead state without perturbing execution of the application or consuming title resources.

The implementation of this API may implement the heuristics to determine when to actually send media state change notifications based on the type of change that has occurred. In general:

1. Changes to fields other than position may trigger notifications being sent at the next available opportunity.
2. Changes made solely to the position field may not trigger a notification being sent. Rather, the console operating system may send periodic media state change notifications, and the next one may pick up the last change in position. For periodic changes over the local subnet, these changes may be sent every ten seconds. For periodic changes over the cloud, these changes may be sent every thirty seconds.

The signature of the API is as follows

```
HRESULT WINAPI LrcSetMediaState(IN LrcMediaState
*pMediaState);
struct LrcMediaState
{
    ULONGLONG duration; // Total duration of content, in 100ns units
    ULONGLONG minSeek; // Minimum seek position, in 100ns units
    ULONGLONG maxSeek; // Maximum seek position, in 100ns units
    ULONGLONG position; // Current playback position, in 100ns units
    float fRate; // Current playback rate (1.0f == normal play)
    ScourTransportState eTransportState; // Current transport state
    TransportCapabilities eTransportCapabilities;
    // Wire rep is "mediaType:mediaAssetId"
    BYTE MediaAssetId[256]; // Null-terminated UTF-8
    // TODO: Min make sure he can get the right asset id from Zune on console
};
```

The function returns S_OK upon success, E_FAIL upon failure.

LrcGetInput/LrcGetInputWithSeek

The LrcGetInput/LrcGetInputWithSeek API is designed to be called as part of a title's input polling routine. LrcGetInput is designed to be called from titles that cannot support seek commands for getting control commands from a companion device. LrcGetInputWithSeek is designed for titles that can support a "seek" operation.

```
HRESULT WINAPI LrcGetInput(
    IN OUT DWORD* pdwUserIndex,
    IN DWORD dwFlags,
    OUT XINPUT_KEYSTROKE *pKeystroke
);
HRESULT WINAPI LrcGetInputWithSeek(
    IN OUT DWORD* pdwUserIndex,
    IN DWORD dwFlags,
    OUT XINPUT_KEYSTROKE *pKeystroke,
    OUT ULONGLONG *pSeekPos
);
```

If there is an input event present, the function returns ERROR_SUCCESS. If there is no input event present, the function returns ERROR_EMPTY.

The pdwUserIndex is a pointer to an index of the signed-in user (e.g., gamer) associated with the device, which can be a value in the range from 0 to XUSER_MAX_COUNT−1, or set to XUSER_INDEX_ANY to fetch the next available input event from any user.

On return, the variable pointed to by pdwUserIndex may contain the index of the gamer associated with the device that was the source of the input event. This is useful if the variable pointed to by pdwUserIndex contained XUSER_INDEX_ANY on input.

The dwFlags parameters may be either XINPUT_FLAG_ANYDEVICE or, if pdwUserIndex has the value XUSER_INDEX_ANY, XINPUT_FLAG_ANYUSER.

The pKeystroke parameter may be a non-null pointer to an XINPUT_KEYSTROKE structure.

The pSeekPos parameter may be a non-null pointer to a ULONGLONG.

For LrcGetInput, if the function returns ERROR_SUCCESS, the structure referenced by pKeystroke may contain the XINPUT_KEYSTROKE data for this input event.

For LrcGetInputWithSeek,
1. If the input was a seek command, the ULONGLONG referenced by pSeekPos may contain the desired position, in 100 ns units, and the structure referenced by pKeystroke may be undefined.
2. If the input was not a seek command but the function returned ERROR_SUCCESS, the ULONGLONG referenced by pSeekPos may be −1 and the structure referenced by pKeystroke may contain the XINPUT_KEYSTROKE data for this input event.

For both of these APIs, the human interface device (HID) code corresponding to the input is standard hardware code. The UserIndex may be set to the correct index based on the companion device's current user, which may be zero to three. In no new keys have been pressed (and the case of GetLnputWithSeek, there is no seek information), the APIs return ERROR_EMPTY. If pdwUserIndex contains an ID on input for which there is no corresponding logged on user, these APIs return ERROR_DEVICE_NOT_CONNECTED.

Implementation of Companion Component Inside Console

At boot, the console creates a TCP listener socket on a dynamic port between X and Y to support incoming connections for commands. The listen queue length is one (1), and the console may accept one incoming connection at a time to conserve resources. That means that after servicing an incoming command request and sending the corresponding response, the console may close the TCP connection prior to making the next accept call on the listener socket.

When sending a notification over the local subnet, the console may create a UDP socket, make the call to sendto, and then close the socket. Note that both the TCP and UDP socket usage is optimized to reduce the number of open sockets, which is the correct optimization for code running in the console. The protocol may be designed to allow implementations to hold TCP connections open for more than one message exchange. In addition to the socket usage described above, one additional socket may be consumed for the console to interact with the companion service.

At each logon change that involves an XBL account/profile logging in or out, the console contacts the companion service indicating that the set of users has changed on that console. This call also registers the local IP address of the console and the TCP port being used to listen for incoming command requests. Additionally, a pending COMET-style HTTP request may be kept "parked" on the service to respond to incoming requests from non-line-of-sight-IP devices. This request is reissued every thirty seconds, and is terminated when the logon set on the console changes.

Console Resource Consumption

The total socket usage from the console is:
1 statically allocated outbound TCP socket for HTTP communications with the service that is used for both logon set registration and COMET event pull.
1 statically allocated TCP listen socket for local subnet requests
1 dynamically allocated TCP stream socket to service an incoming local subnet request
1 dynamically allocated UDP socket to send notification a message That means a minimum of 2 sockets are consumed, and a maximum of 4 (if a UDP notification is allowed to be sent prior to sending a TCP response) or 3 (if notifications are deferred for sending until the TCP connection is torn down).

Protocol Overview

The protocol uses direct TCP connections that are initiated from the companion device to the console to support invoking operations on the console. The protocol design supports multiple pending requests per TCP connection, as well as out-of-order response delivery, however, our console implementation may close the connection after sending the first response.

The protocol uses UDP broadcast from the console to companion devices to support sending notifications. The message formats below may be sent securely over TCP or UDP using the signing/encryption rules described below.

Message Formats

Messages may be encoded in binary big-endian format over the network. Each message fields may be aligned on their native boundary (i.e., WORD on a 2-byte boundary, DWORD on a 4-byte boundary, etc.). Fixed length strings are encoded as '\0'-terminated UTF-8 text, and do not contain a leading Unicode BOM, which may be stripped by the writer.

A secure framing protocol is defined for use in both TCP connections and UDP payloads. The format of those messages includes:
1. A fixed-length Message Header that contains version information, security data, address information and message IDs.
2. A variable-length Message Body that contains message-type-specific data. The length of the message body is indicated by a field in the message header.
3. A fixed length Message Trailer that contains the HMAC-SHA1 signature over the message header and message body.

Message Headers

Messages begin with a 32 byte message header whose content is as follows:
DWORD HeaderSignature=0xBEDABEDA
DWORD MessageLength=<number of bytes in remainder of the message>
DWORD SequenceNumber=<used for replay detection, correlating replies and as the initialization vector for encryption, incremented for each message>
DWORD ProtocolVersion=0x00000001
DWORD To=<device id message is intended for, 0xFFFFFFFF indicates broadcast>
DWORD From=<device id message is from, used for addressing responses>
DWORD MessageKind=<see below>
DWORD MessageType=<see below>

The "To" and "From" message header fields are used to support replay detection as each companion device has its own sequence number. Without the "From" field in requests, the console would not be able to determine which client had sent the message and so would be unable to determine the correct sequence number. Without the "To" field in responses, an attacker could potentially replay a message intended for one device to a different device.

There are two discriminator fields in the message header: MessageKind and MessageType. The MessageKind field indicates whether the message is a:
[0x00000001] Request messages that are used to request an operation be performed (e.g., commands, queries, connection management) or a
[0x00000002] Response messages that conveys the result of an operation that was performed in response to a specific request message, or a
[0x00000003] Notification messages that conveys a state change event The MessageType field identifies the format and semantics of a given operation or notification. An example list of message types supported are:

[0x80000001] JoinSession (request and response)
[0x80000002] LeaveSession (request and response)
[0x00000001] GetActiveTitleId (request and response)
[0x00000002] LaunchTitle (request and response)
[0x00000003] SendInput (request and response)
[0x00000004] GetMediaAndTitleState (request and response)
[0x00000005] NonMediaTitleStateNotification (notification)
[0x00000006] MediaTitleStateNotification (notification)

Response messages have to additional fields in their message header.

DWORD ResponseTo=<SequenceNumber of request this corresponds to>
DWORD ResultCode=<HRESULT-based status code>

"Response" messages begin with a four byte result code that is treated like an HRESULT. Specifically, a value of 0x00000000/S_OK indicates successful execution of the requested operation. Specific result codes are defined for each response message type.

Message Trailers

Messages ends with a 20 byte

BYTE[20] hmac=<HMAC-SHA1 over HeaderSignature, MessageLength, SequenceNumber and encrypted versions of subsequent message header fields and entire message body>

Message Bodies

This section defines the format and semantics of the specific message types that may be supported by the protocol. The bytes follow the SequenceNumber message header field and precede the message trailer are encrypted.

JoinSession Request Message

This message is sent from a companion device to a console in order to (a) ensure that the protocol versions match and (b) acquire initial sequence numbers to use for inbound and outbound messages. The JoinSession request/response may occur before any additional messages from the companion device are sent to the console over the local subnet.

DWORD HeaderSignature=0xBEDABEDA
DWORD MessageLength=number of bytes in remainder of the message>
DWORD SequenceNumber=0xnnnnnnnn <random initial value>
DWORD ProtocolVersion=0x00000001
DWORD To=<device id message is intended for>
DWORD From=<device id message is from>
DWORD MessageKind=0x00000001<Request>
DWORD MessageType=0x80000001<JoinSession>
BYTE[20] hmac=<HMAC-SHA1 over HeaderSignature, MessageLength, SequenceNumber and encrypted versions of subsequent message header fields and entire message body>

JoinSession Response Message

This message is sent to a companion device to/from a console in order to (a) ensure that the protocol versions match and (b) convey initial sequence numbers to use for inbound and outbound messages.

DWORD HeaderSignature=0xBEDABEDA
DWORD MessageLength=<number of bytes in remainder of the message>
DWORD SequenceNumber=0xnnnnnnnn <always the request's SeqeuenceNumber+1>
DWORD ProtocolVersion=0x00000001
DWORD To=<device id message is intended for, same as the From in the JoinSession Request message>
DWORD From=<device id message is from>
DWORD MessageKind=0x00000002<Response>
DWORD MessageType=0x80000001<JoinSession>
DWORD ResponseTo=0xnnnnnnnn
DWORD ResultCode=<see below>
DWORD SupportedProtocolVersion=0xnnnnnnnn
DWORD ClientSequenceNumber=<sequence number the client may use for next request>
DWORD NotificationSequenceNumber=<sequence number the server may use for next UDP notification message>
BYTE[20] hmac=<HMAC-SHA1 over HeaderSignature, MessageLength, SequenceNumber and encrypted versions of subsequent message header fields and entire message body>

If the ResultCode is S_OK (0), then the requested protocol version is supported. Also:

1. The SupportedProtocolVersion contains the protocol version number supported by this server.
2. The ClientSequenceNumber contains the sequence number that the client may use for the next message it sends to the server.
3. The NotificationSequenceNumber contains the sequence number for the next notification message to be sent by the server over UDP.

If the ResultCode is E_VERSION_MISMATCH (0x8hhhhhhh), then the session has not been joined and only the SupportedProtocolVersion field is valid. If the ResultCode is E_TOO_MANY_CONNECTIONS (0x8hhhhhhh), then the session has not been joined and SupportedProtocolVersion, ClientSequenceNumber and NotificationSequenceNumber are not valid.

GetActiveTitleId Request Message

This message is sent from a companion device to a console in order to query the active title ID on the console.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for>
DWORD From=<device id message is from>
DWORD MessageKind=0x00000001<Request>
DWORD MessageType=0x00000001<GetActiveTitleId>
BYTE[20] hmac=<HMAC-SHA1 over HeaderSignature, MessageLength, SequenceNumber and encrypted versions of subsequent message header fields and entire message body>

GetActiveTitleId Response Message

This message is sent to a companion device to/from a console in response to a GetActiveTitleId request message and indicates the currently running title.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for, same as the From in the GetActiveTitleId Request message>
DWORD From=<device id message is from>
DWORD MessageKind=0x00000002<Response>
DWORD MessageType=0x00000001<GetActiveTitleId>
DWORD ResponseTo=0xnnnnnnnn
DWORD ResultCode=0x00000000
DWORD TitleId=0xnnnnnnnn BYTE[20] hmac=<HMAC-SHA1 over HeaderSignature, MessageLength, SequenceNumber and encrypted versions of subsequent message header fields and entire message body>

The TitleId is the console Title ID for the title currently running on the console.

LaunchTitle Request Message

This message is sent from a companion device to a console in order to launch a title with a specified command-line argument.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for>
DWORD From=<device id message is from>
DWORD MessageKind=0x00000001<Request>
DWORD MessageType=0x00000002<LaunchTitle>
DWORD TitleId
DWORD LaunchParameterLength; (Not Used)
BYTE[900] LaunchParameter (Null-terminated UTF-8 text)
BYTE[20] hmac=<HMAC-SHA1 over HeaderSignature, MessageLength, SequenceNumber and encrypted versions of subsequent message header fields and entire message body>

The TitleId is the console Title ID for the title currently running on the console. The LaunchParameter field typically identifies the content to be played once the title has launched. The exact interpretation of this field is title-specific.

LaunchTitle Response Message

This message is sent to a companion device to from a console in order to indicate the success/failure of title launch.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for, same as the From in the LaunchTitle Request message>
DWORD From=<device id message is from>
DWORD MessageKind=0x00000002<Response>
DWORD MessageType=0x00000002<Launch>
DWORD ResponseTo=0xnnnnnnnn
DWORD ResultCode=0x00000000
BYTE[20] hmac=<HMAC-SHA1 over HeaderSignature, MessageLength, SequenceNumber and encrypted versions of subsequent message header fields and entire message body>

SendInput Request Message

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for>
DWORD From=<device id message is from>
DWORD MessageKind=0x00000001<Request>
DWORD MessageType=0x00000003<SendInput>
DWORD ValidFields=0x01—VirtualKey, 0x02—SeekPos, 0x03—Both
DWORD VirtualKey=<virtual keycode from XDK>
ULONGLONG SeekPosition
BYTE[20] hmac=<HMAC-SHA1 over HeaderSignature, MessageLength, SequenceNumber and encrypted versions of subsequent fields>

The ValidFields field has a value of 0x01 if the request contains a keystroke, 0x02 if the request contains a seek command and 0x03 if it contains both. The VirtualKey is identical to its definition in XINPUT_KEYSTROKE. The SeekPosition is used to convey a seek command. If this request message is NOT indicating a seek, this field may have a value of 0xFFFFFFFFFFFFFFFF (−1).

SendInput Response Message

This message is sent to a companion device to/from a console in order to indicate the success/failure of the SendInput operation.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for, same as the From in the SendInput Request message>
DWORD From=<device id message is from>
DWORD MessageKind=0x00000002<Response>
DWORD MessageType=0x00000003<SendInput>
DWORD ResponseTo=0xnnnnnnnn
DWORD ResultCode=0x00000000
BYTE[20] hmac=<HMAC-SHA1 over HeaderSignature, MessageLength, SequenceNumber and encrypted versions of subsequent message header fields and entire message body>

GetMediaAndTitleState Command Message

This message is sent from a companion device to a console in order to query the media state on the console.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for>
DWORD From=<device id message is from>
DWORD MessageKind=0x00000001<Request>
DWORD MessageType=0x00000004<GetMediaAndTitleState>
BYTE[20] hmac=<HMAC-SHA1 over HeaderSignature, MessageLength, SequenceNumber and encrypted versions of subsequent message header fields and entire message body>

GetMediaAndTitleState Response Message

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=<device id message is intended for, same as the From in the GetMediaAndTitleState Request message>
DWORD From=<device id message is from>
DWORD MessageKind=0x00000002<Response>
DWORD MessageType=0x00000004<GetMediaAndTitleState>
DWORD ResponseTo=0xnnnnnnnn
DWORD ResultCode=0x00000000
DWORD TitleId
ULONGLONG Duration (100 ns units)
ULONGLONG Position (100 ns units)
ULONGLONG MinSeek (100 ns units)
ULONGLONG MaxSeek (100 ns units)
FLOAT Rate (playback rate, 1.0==normal)
DWORD TransportState (see ScourTransportState enum in console API below)
DWORD TransportCapabilities (see TransportCapabilities enum in console API below)
DWORD MediaAssetIdLength; (Not Used)

BYTE[256] MediaAssetId (Null-terminated UTF-8 text)
BYTE[20] hmac=<HMAC-SHA1 over HeaderSignature, MessageLength, SequenceNumber and encrypted versions of subsequent fields>

If the ResultCode is S_OK (0) and the TransportState is not SCOURTRANSPORTSTATE_NOMEDIA, then the other media state fields (Duration, Position, . . . , MediaAssetId) are all valid. If the ResultCode is S_OK (0) and the TransportState is SCOURTRANSPORTSTATE_NOMEDIA, then there is no current media on the console and the remaining media state values are undefined.

NonMediaTitleStateNotification Message

The NonMediaTitleStateNotification message indicates that a non-media-enabled console title (e.g., a game) is currently running on the console. The NonMediaTitleStateNotification message is sent by the console via UDP broadcast when:
1. A non-media-enabled title is running (e.g., a game). AND
2. No NonMediaTitleStateNotification or MediaTitleStateNotification has been sent since the update interval (10 seconds). OR a non-media-enabled title has been launched.

This message does NOT need to be sent from the console to the cloud, as title change forces a re-authentication against the cloud, which conveys the title ID. This message may be sent from the cloud to the companion devices.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=0xFFFFFFFF
DWORD From=<device id message is from>
DWORD MessageKind=0x00000003<Notification>
DWORD MessageType=0x00000005<NonMediaTitleStateNotification>
DWORD TitleId
BYTE[20] hmac=<HMAC-SHA1 over HeaderSignature, MessageLength, SequenceNumber and encrypted versions of subsequent fields>

MediaTitleStateNotification Message

The MediaTitleStateNotification message indicates that a media-enabled console title (e.g., a tile related to a video streaming service) is currently running on the console. This message conveys both the console title ID as well as the current content ID and playhead state.

The MediaTitleStateNotification message is sent by the console via UDP broadcast when:
1. A media-enabled title is running (e.g., a game). AND
2. No NonMediaStateTitleNotification or MediaTitleStateNotification has been sent since the update interval (10 seconds). OR a media-enabled title has been launched OR a transport control command has been processed by the title (e.g., play, stop).

The MediaTitleStateNotification message is sent by the console to the cloud when:
1. A media-enabled title is running (e.g., a game). AND
2. No NonMediaTitleStateNotification or MediaTitleStateNotification has been sent since the update interval (30 seconds). OR a media-enabled title has been launched OR a transport control command has been processed by the title (e.g., play, stop).

This message may be sent from the cloud to the companion devices.

DWORD HeaderSignature=0xBEDABEDA
DWORD MessageLength=0xnnnnnnnn
DWORD SequenceNumber=0xnnnnnnnn
DWORD ProtocolVersion=0x00000001
DWORD To=0xFFFFFFFF
DWORD From=<device id message is from>
DWORD MessageKind=0x00000003<Notification>
DWORD MessageType=0x00000006<MediaTitleNotification>
DWORD TitleId
ULONGLONG Duration (100 ns units)
ULONGLONG Position (100 ns units)
ULONGLONG MinSeek (100 ns units)
ULONGLONG MaxSeek (100 ns units)
FLOAT Rate (playback rate, 1.0=normal)
DWORD TransportState (see ScourTransportState enum in console API below)
DWORD TransportCapabilities (see TransportCapabilities enum in console API below)
DWORD MediaAssetIdLength; (Not Used)
BYTE[256] MediaAssetId (Null-terminated UTF-8 text)
BYTE[20] hmac=<HMAC-SHA1 over HeaderSignature, MessageLength, SequenceNumber and encrypted versions of subsequent fields>

If the TransportState is not SCOURTRANSPORTSTATE_NOMEDIA, then the other media state fields (Duration, Position, . . . , MediaAssetId) are valid. If the TransportState is SCOURTRANSPORTSTATE_NOMEDIA, then there is no current media on the console and the remaining media state values are undefined.

Console and Cloud Communication

When a user logs on to the console, the console reports the user info to the cloud so that the cloud may know who is logged onto the console. The console also tells the cloud about its local subnet IP address. The console reports to the cloud when a user logs off.

Notification Model

The console may use the unicast approach to announce certain changes on the console, like title change, media state change, and so on. The socket established between the device and the console may be used to do this.

On the companion device side, the runtime library may provide notification capability. That is, a linking module can register for whatever events it is interested in and the runtime layer may notify the app to those events as the events happen.

Runtime Library on the Device Side

A runtime library may be utilized on each supported devices.

Here are example APIs that may be supported:
1. bool JoinSession( )
This API may connect a device to the console host specified by the "hostIPAddress".
Return value: Return TRUE if the connection is good. Otherwise, return false.
Sample Usage: JoinSession ( );
It may get from the cloud the local subnet IP address of the console after the pairing is successful. It also gets the security key from the cloud that it can use to secure communication with the console.

2. DisconnectSession( )
This API may close the connection between your device and the currently connected console. Note: the runtime uses this API to clean up the session data; close the socket with the console. Of course, when the device goes to sleep, the console may know. So it can close the socket.

3. TitleInfo[ ] GetAvailableTitles( )
This API may provide you with a list of titles the living room companion experience supports currently.

```
struct TitleInfo
{
  uint titleId;
  string friendlyName;
}
```

For example, here is one of the possible returns from this function:

```
{
  1481115612;
  " Zune";
}
{
  "1481115605";
  "Netflix";
}
```

4. unsigned int GetCurrentRunningTitleId( )
This API returns you the titleID of the currently running title on the currently connected console.
5. void Launch(unsigned int TitleId, string parameter)
This API may launch an app, specified by the "TitleId, with the given parameter, specified in "parameter".
TitleId—The title ID of the app you want to launch. Caller gets the friendly app name from calling "GetListOfAvailableTitles( )"
Parameter—The parameter you want to pass to the title during lunch.
6. void SendControlCommand(CommandType key)
This API sends a console control command to the current connected console.

```
CommandType
{
  Play,
  Pause,
  FastForword,
  Rewind,
  Stop
}
```

7. Notification APIs
enum consoleProperty

```
{
  TitleChanged,
  MediaStateChange,
  SubNetConnectionLost
};
``` public interface IconsolePropertyChangeDelegate

```
{
  void propertyChanged( Object value);
}
``` void SetPropertyChangedCallback(consoleProperty propertyType, IconsolePropertyChangeDelegate delegate)

These APIs are used to let the device receive notification events from the console, like the state change, title change on the console, and so on. Although specific examples are described, it should be readily apparent that the discussion and following claims are not necessarily limited to those examples.

Example System and Device

Figure 6:
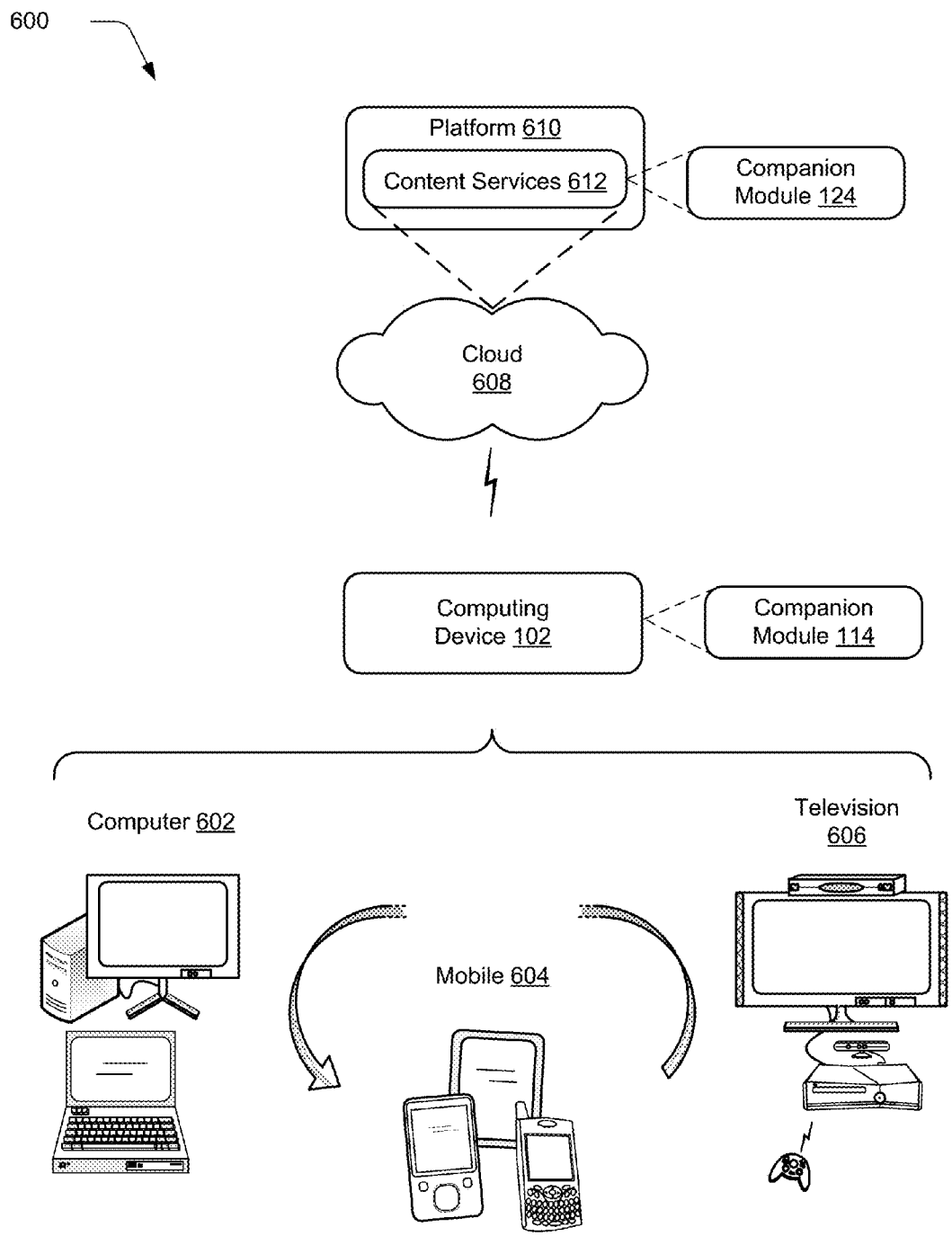
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 604 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network. Examples of this are illustrated as inclusion of the linking module 114 on the computing device. As previously described, these techniques may also leverage "the cloud," such as through implementation of the linking module 124 as part of the platform 310 described below.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
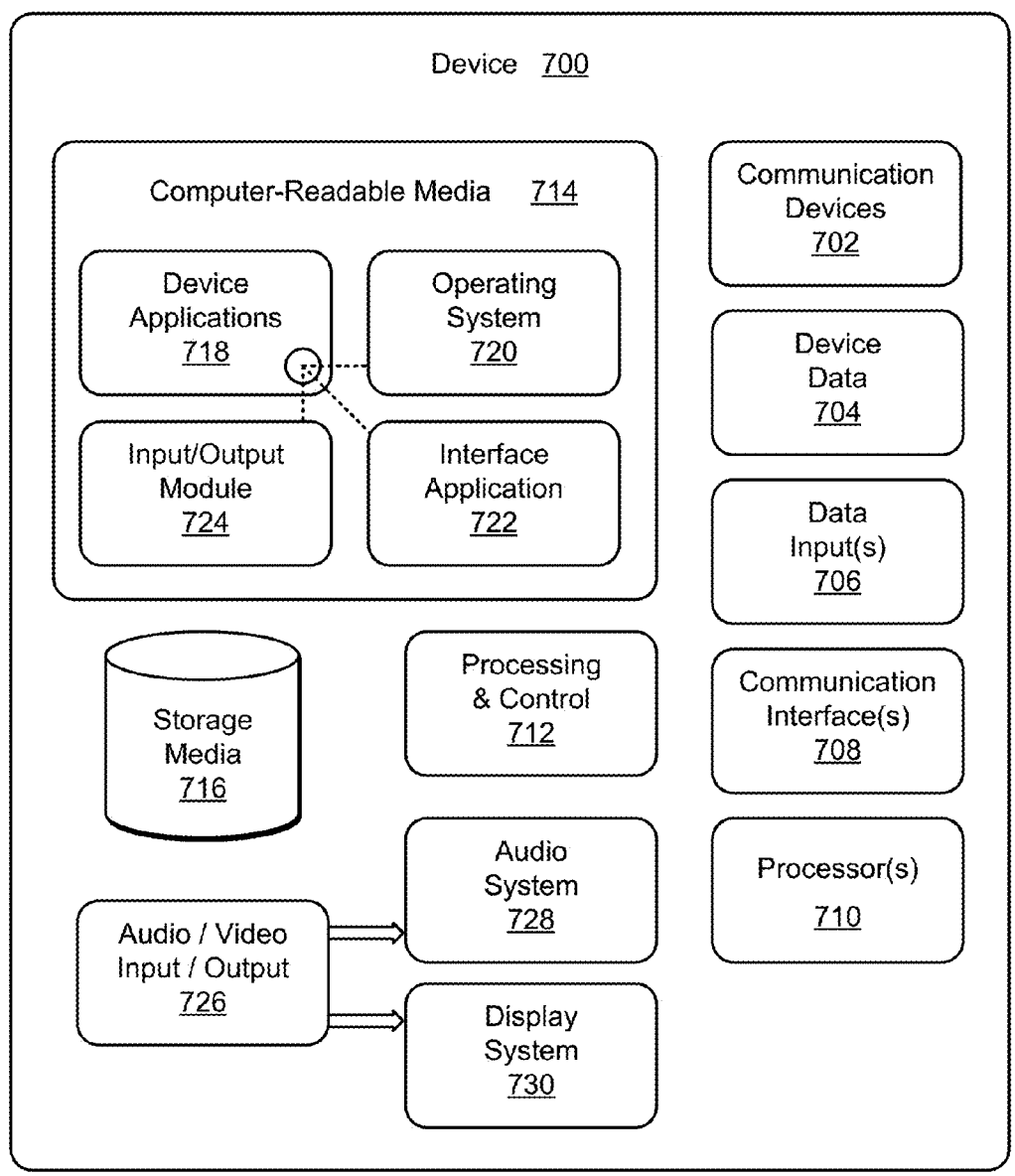
FIG. 7 illustrates various components of an example device that can be implemented as any type of computing device as described with reference to FIGS. 1-4 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A device, comprising:
a memory and a processor that are respectively configured to store and execute instructions for causing the device to perform actions, the actions comprising:
receiving linking data from a network service, wherein the linking data includes information to enable devices associated with a user account to be linked with each other;
linking the device to a different device using the linking data, wherein the device and the different device are associated with the user account according to a registration of the device and the different device such that the device and the different device are discoverable by other devices associated with the user account;
receiving control data from the different device, wherein the control data instructs the device perform at least one operation requested via the different device; and
performing the at least one operation requested via the different device.

2. The device of claim 1, wherein the actions further comprise:
receiving other control data from the different device, wherein the other control data enables the device to control operations of the different device.

3. The device of claim 1, wherein the control data corresponds to a non-touch interaction recognized by the different device.

4. The device of claim 1, wherein the control data corresponds to an audio input received by the different device.

5. The device of claim 4, wherein the audio input was received through a microphone of the different device, and the audio input was a command from a particular user.

6. The device of claim 1, wherein the actions further comprise:
transmitting the control data in response to a recognition of at least one of a gesture, a presented object, or an image through a camera of the device.

7. The device of claim 1, wherein the control data corresponds to an identification of a particular user in an image captured by a camera of the different device.

8. The device of claim 1, wherein the control data corresponds to facial recognition of a face of a particular user.

9. The device of claim 1, wherein the at least one operation is associated with a game.

10. The device of claim 1, wherein the at least one operation is associated with controlling an output of content through interaction with an electronic programming guide (EPG) on a display of the device.

11. The device of claim 1, wherein the actions further comprise:
determining that the different device is available for linking based on a location of at least one of the device or the different device.

12. The device of claim 1, wherein the actions further comprise:
determining a type of connection to establish for linking the device to the different device based on location information regarding the device and the different device.

13. A method, comprising:
receiving linking data, wherein the linking data includes information to enable multiple devices associated with a user account to be linked;
linking a first device of the multiple devices to a second device of the multiple devices using the linking data, wherein the first device and the second device are associated with the user account according to registrations of the first device and of the second device, and such that the first device and the second device are discoverable by other devices associated with the user account;
receiving control data from the second device, wherein the control data includes an instruction for the first device to perform at least one operation; and
in response to receiving the control data, performing the at least one operation.

14. The method of claim 13, wherein the control data corresponds to at least one of a non-touch interaction recognized by the second device, an audio input received by the second device, an identification of a particular user in an image, or a facial recognition of a face of a particular user.

15. The method of claim 13, wherein the at least one operation is associated with a game.

16. The method of claim 13, wherein the at least one operation is associated with controlling an output of content through interaction with an electronic programming guide (EPG) on a display of the first device.

17. The method of claim 13, further comprising:
determining that the second device is available for linking based on a location of at least one of the first device or the second device.

18. The method of claim 13, further comprising:
determining a type of connection to establish for linking the first device to the second device based on location information regarding the first device and the second device.

19. A device, comprising:
a memory and a processor that are respectively configured to store and execute instructions for causing the device to perform actions, the actions comprising:
linking a first computing device to a second computing device using linking data from a network service, the first computing device and the second computing device being associated with a user account and the linking data enabling devices associated with the user account to be linked with each other, the first computing device and the second computing device being associated with the user account according to registration of the first computing device and the second computing device for discovery by other devices associated with the user account; and
transmitting control data to the second computing device, wherein the control data includes an authorization for the first computing device to control operations of the second computing device.

20. The device of claim 19, wherein the actions further comprise:
transmitting an instruction for the second computing device to perform at least one operation requested via the first computing device.

* * * * *